United States Patent [19]
Hübner et al.

[11] Patent Number: 5,642,811
[45] Date of Patent: Jul. 1, 1997

[54] RECEIVING DEVICE FOR ARTICLES, IN PARTICULAR STRIP MATERIALS WOUND UP AS WOUND ROLLS

[75] Inventors: Dietmar Hübner, Oberkirch; Rainer Müll; Kurt Zwintzscher, both of Willstätt; Wolfgang Martiny, Oberkirch; Hartmut Thiele, München; Ekkehard Hirschberg, Offenburg, all of Germany

[73] Assignee: BASF Magnetics GmbH, Mannheim, Germany

[21] Appl. No.: 605,043

[22] PCT Filed: Aug. 25, 1994

[86] PCT No.: PCT/EP94/02809

§ 371 Date: Mar. 1, 1996

§ 102(e) Date: Mar. 1, 1996

[87] PCT Pub. No.: WO95/07533

PCT Pub. Date: Mar. 16, 1995

[30] Foreign Application Priority Data

Sep. 4, 1993 [DE] Germany .............. 9313349 U

[51] Int. Cl.[6] ................................ B65D 85/66
[52] U.S. Cl. .................. 206/391; 206/394; 206/303
[58] Field of Search ................ 206/303, 391, 206/394, 598, 600, 710, 723; 242/575.3; 220/4.22, 4.23

[56] References Cited

U.S. PATENT DOCUMENTS

| | | | |
|---|---|---|---|
| 5,165,542 | 11/1992 | Sommerfeldt et al. | 206/394 |
| 5,287,964 | 2/1994 | Jacquand et al. | 206/391 |
| 5,303,823 | 4/1994 | Niles et al. | 206/303 |
| 5,501,325 | 3/1996 | Mehltretter | 206/303 |

FOREIGN PATENT DOCUMENTS

| | | |
|---|---|---|
| 89 00 764 | 4/1989 | Germany. |
| 41 39 463 | 6/1993 | Germany. |

OTHER PUBLICATIONS

Enzymatic Aminolysis... Gotor et al., Tetrahedron, vol. 47, No. 44, pp. 927–2914, 1991.
Chem Abst. 115:278181j, Fermentations, vol. 115, 1991, p. 847.
Enzymatic Synthesis of Amides... Brieva et al., J. Chem So., 1990, pp. 1386–1387.
Lipase–Catalyzed Synthesis..., Tetrahedron, vol. 4, No. 6, pp. 1105–1112, 1993, Quiros et al.

*Primary Examiner*—David T. Fidei
*Attorney, Agent, or Firm*—Keil & Weinkauf

[57] ABSTRACT

A receiving and transporting device for articles with a through-opening comprises a basic frame and two interconnectable container bodies, one of the end-face openings fitting over one of the body rear parts, for volume reduction and storage purposes. A special transport pallet is designed for receiving four devices with or without content.

14 Claims, 5 Drawing Sheets

RECEIVING DEVICE FOR ARTICLES, IN PARTICULAR STRIP MATERIALS WOUND UP AS WOUND ROLLS

BACKGROUND OF THE INVENTION

1. Field of the Invention

The invention relates to a receiving device for articles with a through-opening, in particular for materials in strip form wound up onto winding hubs or reels as wound rolls, comprising an L-shape basic frame and at fastened thereon least one receiving spindle and a separable container body for the complete enclosure of the articles,

2. Description of the Related Art

DE-U-8,900,764 discloses a container for pancakes. In it, the rolls are stored horizontally on spindle stubs in closed containers and are stacked one on top of the other. In it, only a few rolls of video tape can be stored.

For a container for a larger number of magnetic tape pancakes, the suspended mode of transportation for the rolls of tape is preferred.

DOS 4,139,463 discloses the arranging of a multiplicity of pancakes on 4 spikes in a 1×1 m container, special sophisticated robots being intended to carry out the loading and removal of the pancakes. In tape production and at the customer's premises, for example manufacturers of prerecorded tapes, this known system necessitates intermediate storage in magazines and, for this purpose, reloading of the pancakes twice, entailing the usual risk of damage.

Due to the size of the container, there is little to be gained from its use directly in the production process or in the recording process. The size of the container also cannot be reduced for return transportation.

The known receiving container for magnetic-tape pancakes according to US-A-5 094 346 comprises an L-shape basic frame with two horizontally projecting receiving spindles for the rolls of tape, over which a cover body can be fitted, which cover body, combined with the basic frame, completely closes off the rolls of tape. To remove the rolls of tape, it is necessary to take off the cover body, it not being possible to reduce the volume of the known receiving container, particularly since the volume of the cover body, made for example of plastic, cannot be reduced.

It is an object of the present invention to provide a receiving device as specified in the introduction, which is of a size which can be handled, has a high capacity for pancakes in its transporting volume and has a space-saving working volume.

SUMMARY OF THE INVENTION

We have found that this object is achieved by a receiving device for articles with a through-opening, in particular for materials in strip form wound up onto winding hubs or reels as wound rolls, comprising an L- shape basic frame and at fastened thereon least one horizontal receiving spindle, and a separable container body for the complete enclosure of the articles, if the container body comprises two shell bodies, a fixed shell body, fastened on the basic frame, and a mobile shell body, which respectively have bottom, top, back or front and side walls and can be locked together, with their openings facing each other, by means of locking devices to form a receiving container which is closed on all sides, and, by slipping the mobile shell body with its opening over the rear wall, parts of the top wall and of the side walls of the fixed shell body, a receiving container which is accessible for the removal of the articles can be produced.

This achieves the effect that, for unloading or loading the device, the mobile part receives its fixed place, namely in "pickaback" style on the back of the fixed body, with the further advantage of a reduction in the overall volume, and is available for closing the loaded or unloaded device. The receiving device is very suitable for transporting the reels or wound rolls. The receiving device is V.

To make the pickaback connection of mobile body and fixed body secure, matching fixing means are provided on both bodies.

For easier handling during transportation, grip hollows, in particular recessed depressions, are provided at least on the mobile body.

For secure transportation on pallets, the fixed and mobile bodies may be provided on the bottom wall or top wall with fixing means with respect to the pallets, which for their part have matching fixing devices. There may expediently be a plurality of groups of fixing devices fitted on the transport pallet.

In a further development of the device, the parting plane between fixed body and mobile body runs substantially diagonally through the container body.

In this case, the seal of the parting joints is expediently likewise arranged in this plane, in order to make the sealing elements and their fitting unproblematical In an advantageous design, at least one wall of either the fixed or mobile body is designed with at least one window, in particular of synthetic glass, so that the content of each container body can be easily determined.

In a further expedient development, protective strips may be used on the fixed and mobile bodies to prevent scratching and deforming of the walls of the device.

With regard to simplifying cleaning, it is also advantageous to provide a swivel mounting in the vicinity of the edge of the device formed by the bottom wall and rear wall, so that the fixed body can be swivelled backward.

In this case, catching means should be provided for the fixed body in its non-swivelled position.

In a configuration which is favorable in practice, the device is designed with a basic frame which substantially comprises a bottom frame, a T-shape member for the receiving spindles and substantially diagonally arranged side members, the side members connecting the crossmember to the bottom frame.

As a result, high stability for high wound roll loads is obtained at the same time as inexpensive production.

The basic frame is also substantially only part of the fixed body, and the mobile body may be formed without a frame.

BRIEF DESCRIPTION OF THE DRAWING

The invention is described below with reference to exemplary embodiments represented in the drawing.

DESCRIPTION OF THE PREFERRED EMBODIMENT

Figure 1:
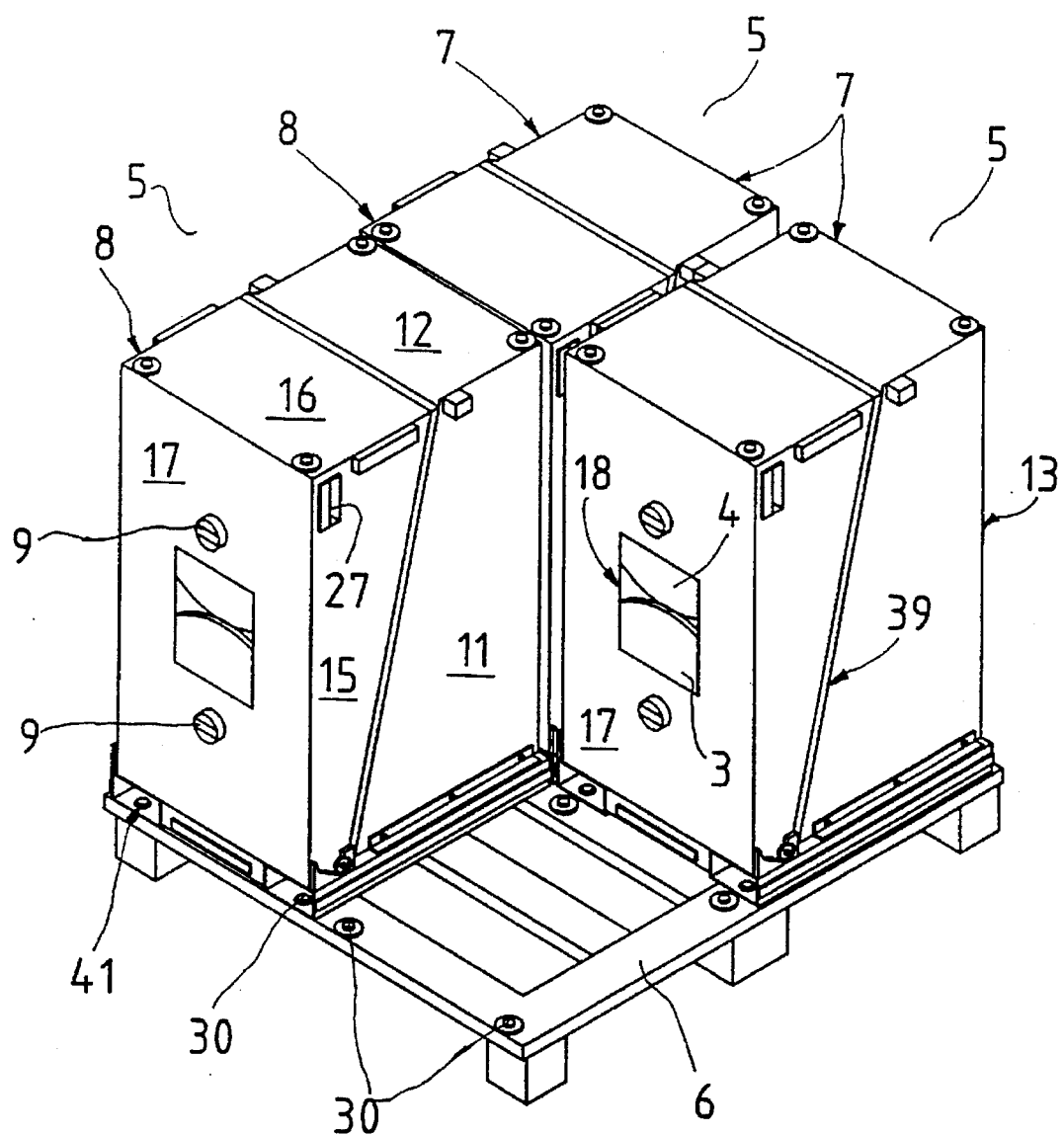
FIG. 1 shows a pallet with three receiving and transporting devices according to the invention

In FIG. 1, three receiving and transporting devices, hereinafter containers 5, are arranged on a specially designed transport pallet 6, one place for a further container 5 remaining free.

Each of the containers 5 comprises two container bodies, a fixed body 7 and a mobile body 8, which are interconnected by means of two closures 9. The fixed body 7 has the bottom wall 10 (which can be seen in FIG. 2), the side walls 11, the top wall 12 and the rear wall 13. Correspondingly, the mobile body 8 has the lower wall 14, the side walls 15, the upper wall 16 and the front wall 17.

The side walls which cannot be seen in FIG. 1 are denoted by 11' and 15' respectively.

In the center of the front wall 17 there is provided a window 18, for example of synthetic glass or safety glass, to preclude breakage. The wound rolls 3, 4 can be partially seen through the window 18, so that it can be ascertained immediately to what extent and with what the container 5 is filled.

Figure 2:
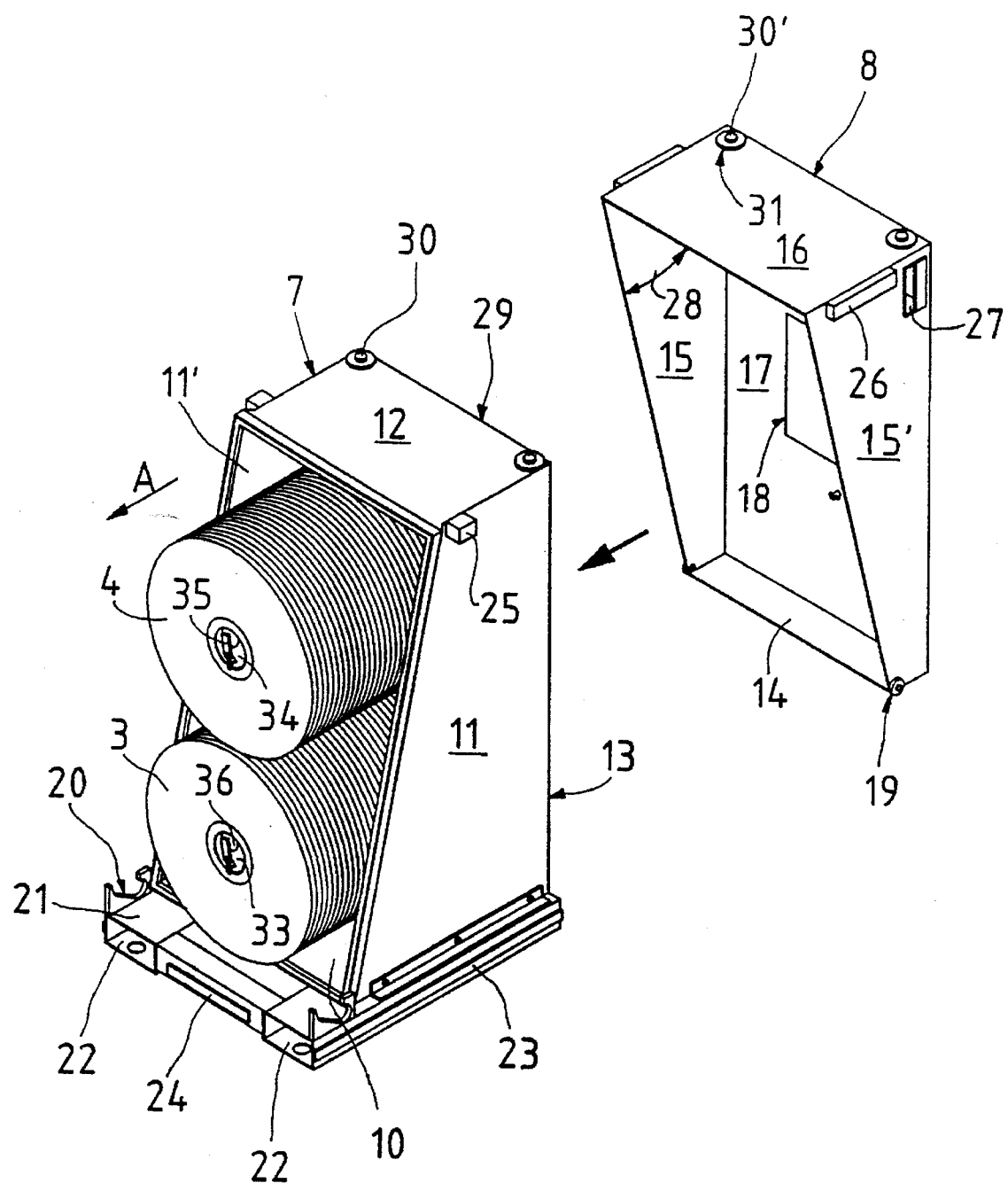
FIG. 2 shows an opened receiving and transporting device with two spindles on which rolls of tape are suspended

Details of the container 5 and of the individual parts, fixed and mobile bodies 7 and 8, can be seen better in FIG. 2.

After releasing the closures 9, the mobile part 8 can be taken off forward (direction of arrow A), the sliding disks 19 on the outside of the side walls 15, 15' being able to be withdrawn from side mountings 20 provided on the lower, front part of the side walls 11 and 11'.

Sliding disks 19 and side mountings 20 represent positioning devices for the mobile body 8, to prevent the same coming into contact with the wound rolls 3, 4 when it is taken off, with the possibility of damaging said rolls. The positioning devices may also be differently designed in a suitable way. The side mountings 20 are fastened on hollow-section rails 21, which are fitted in twos underneath the bottom walls 14 and 15 of the closed container 5 and the openings 22 of which serve for entry of the fork prongs of the forklift truck. 23 to 26 denote scuff-protecting strips and blocks, which at the top (25, 26) and on the side parts 11, 11' and 15, 15' can also be used as grips. Grip hollows 27 are additionally provided in the vicinity of the front wall 17 of the mobile body 8 on the side walls 15, 15'.

For removal of the wound rolls 3 and 4, the mobile body 8 is taken off, whereby the lower wound rolls 3 also become easily accessible. After taking off the mobile body 8 and turning it through 180°, the position in FIG. 2 is obtained. Provided that the contour of the vertical projection of the (inner) opening 28 of the mobile body 8 is greater than the outer contour 29 of the rear wall 13 of the fixed body 7, the mobile body 8 can be placed from the rear onto the fixed body 7, according to the arrow, so that the overall volume of the separated container body 7 and 8 is reduced by about one sixth in the example represented. A further reduction is readily possible. However, also important in this case is the advantage that the mobile body 8 has its fixed and secure place, in pickaback style, on the fixed body 7. The secure connection is accomplished by means of the fixing pins 30 on the top wall 12 of the fixed body 7, which engage in corresponding depressions 31 underneath the fixing pins 30' of the mobile body 8. Consequently, the secure connection can be established and separated quickly by simple inserting on and taking off.

The continuation 32 (which can be seen in FIG. 2) on the inner side of the front wall 17 serves for engaging in the receiving spindle 33 of the wound rolls 3, 4 in the closed state of the container 5, see FIG. 1.

The wound rolls 3 and 4, suspended on the receiving spindles 33 and 34 respectively, are secured on the respective spindle 33 or 34 by means of the clamping levers 35. A gripping groove 36 in each spindle 33 and 34 serves for damage-free removal of the individual wound rolls 3, 4.

Provided around the access opening 36 of the fixed body 7 is a hollow groove 38 with a suitable seal 40, for example as a hollow rubber section or sponge rubber. This is intended to achieve as hermetic as possible sealing of the parting joints 39 with the edge of the opening 28 of the mobile body 8. The one parting plane is expediently to extend substantially diagonally through the container 5, so that the sealing elements—hollow groove 38, seal 40—also lie in one plane, so that no sealing problems are to be expected, a danger which exists if there are a plurality of intersecting parting planes. The approximately diagonal division also serves for easy accessibility of the wound rolls 3 and 4.

As can be seen from FIG. 1, the container 5 has externally on its top wall 12, and on the upper wall 16, 4 fixing pins 30, 30'. Corresponding pins with depressions or matching recesses 41 are provided on the underside of the hollow-cuboid rails 21, in order that the arresting devices, fixing pins 30, of the transport pallet 6, which are arranged in groups as squares, can engage therein.

Figure 5:
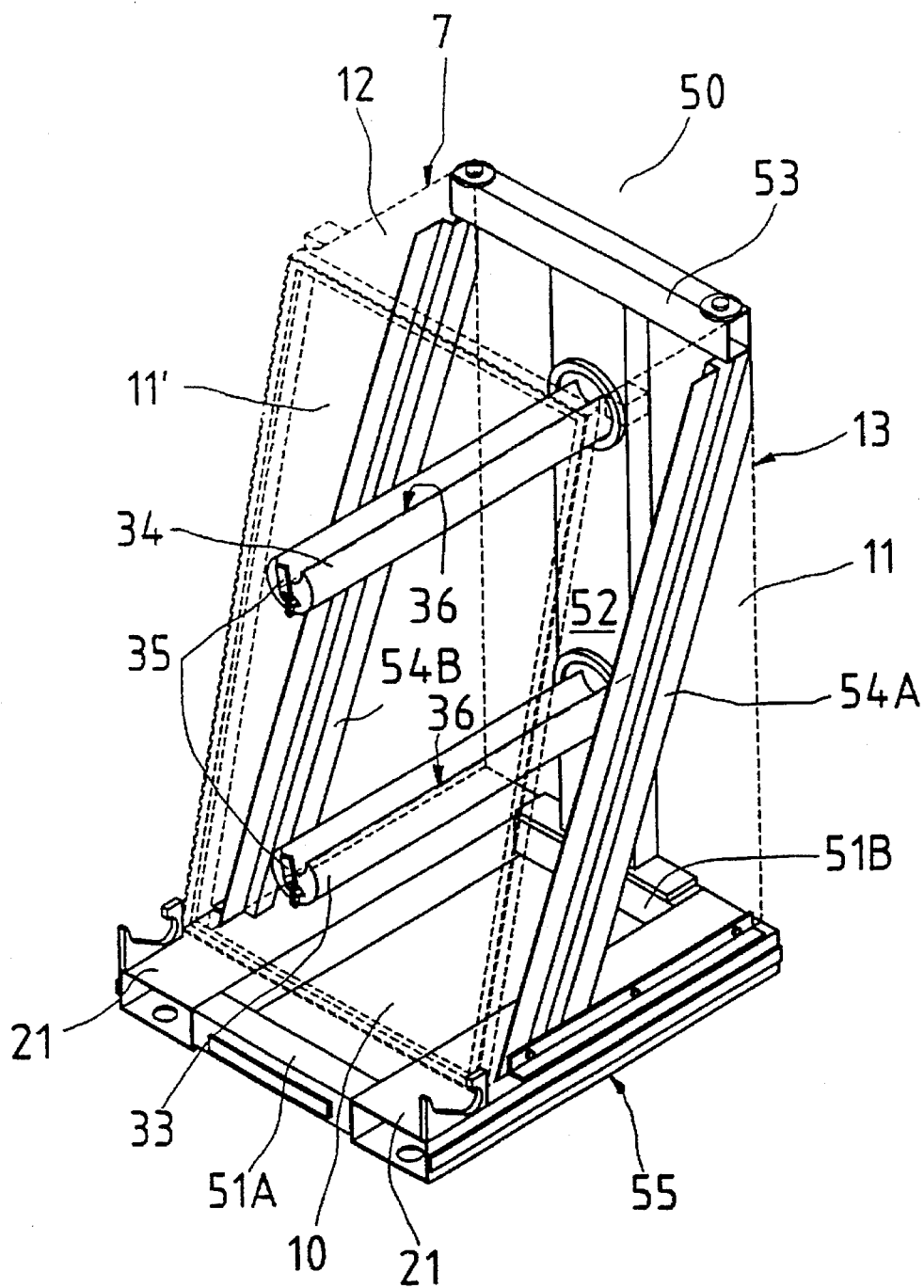
FIG. 5 shows the device without mobile body with the basic frame.

The hollow-cuboid rails 21 are parts of the basic frame 50 of the container 5, which is represented in FIG. 5 and is further described below.

Figure 3:
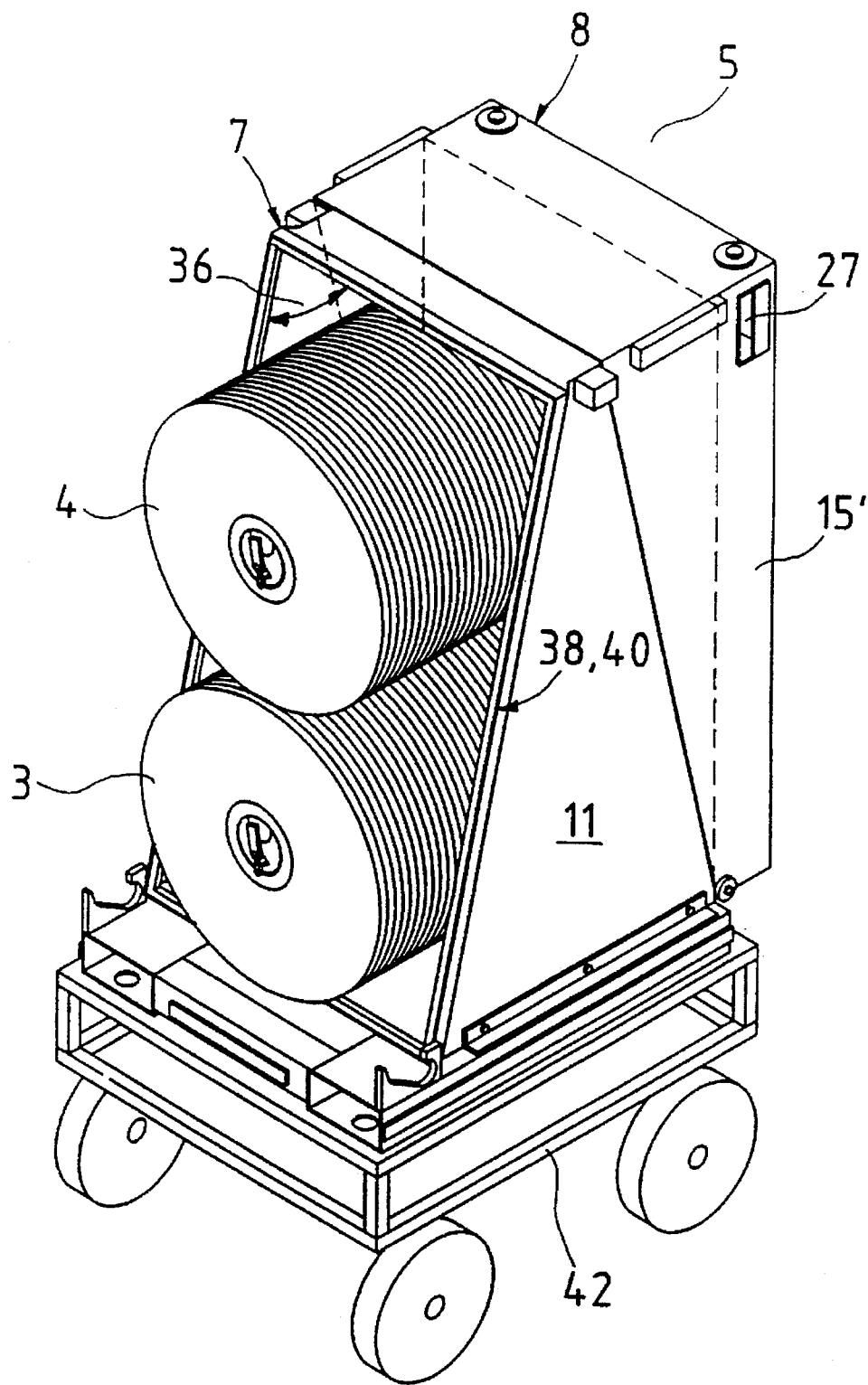
FIG. 3 shows the receiving and transporting device according to FIG. 2 in pickaback arrangement

The carriage 42, represented in FIG. 3, serves for the transportation of a single container 5. The same is able to be configured suitably.

Owing to the great weight of the wound rolls 3, 4 of about 160 kg, the basic frame comprises a metal or steel rack, cf. FIG. 5. The walls of the container bodies 7 and 8 expediently comprise aluminum or aluminum alloy plates or suitable easily cleanable plastic panels.

The containers 5 are also able to be stacked one on top of the other (pins 30, 30', cutouts 41).

So far, only one version of the container 5 has been described, distinguished by an outer smooth cuboidal form.

It will also be conceivable to use an outer-inner graduated hollow cuboidal form or a hollow pyramidal form for both bodies, fixed body and mobile body, if the larger cuboidal form part or pyramidal form part respectively receives the smaller part, and if in the pickaback state (working volume) and in the closed state (transporting volume) the edges of the openings of the fixed and mobile bodies are designed such that, abutting against one another, they can be sealed.

Figure 4:
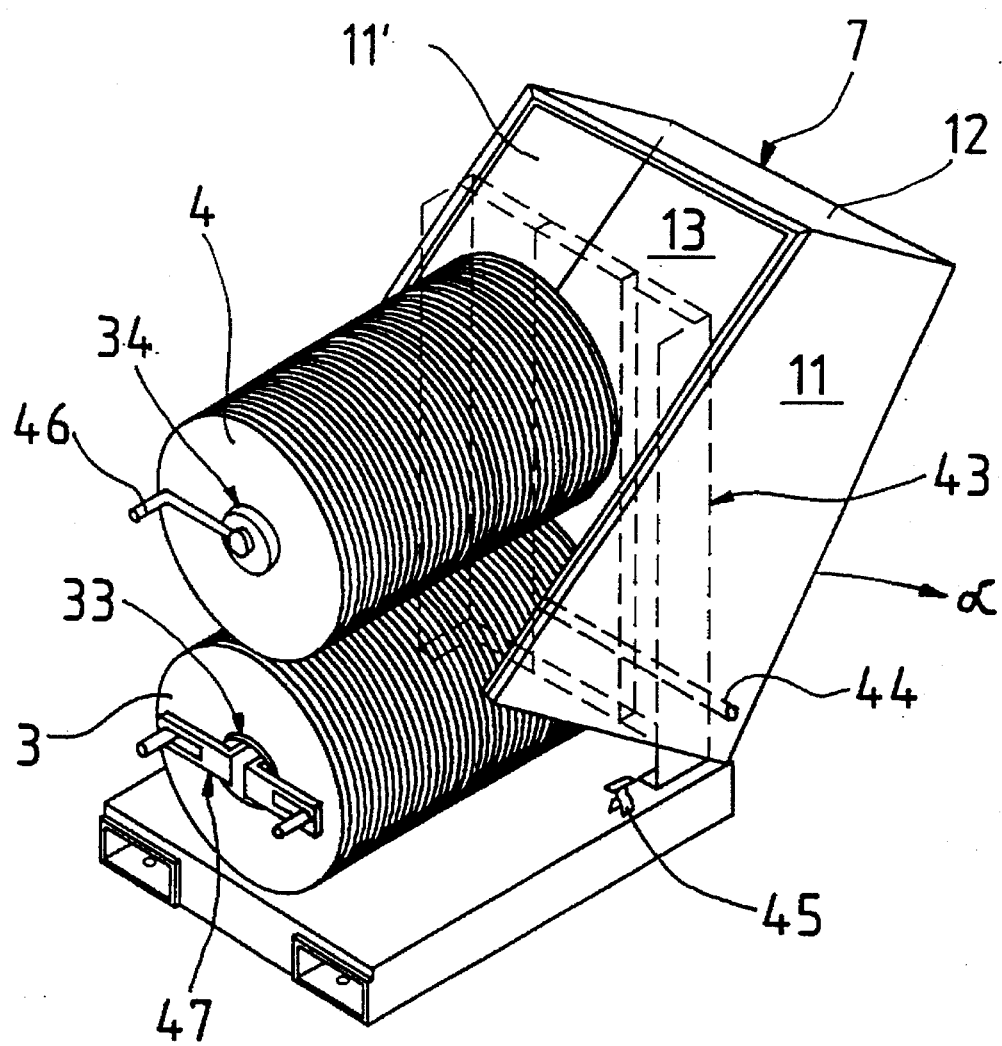
FIG. 4 shows a different version of the device

FIG. 4 shows a fixed body 7 with a bottom wall 10 and hollow-section rails 21, as substantially represented in FIG. 2.

However, represented in dashed lines is a frame rear part 43, on which the spindles 33 and 34 for the wound rolls 3 and 4 are fastened and which is connected to the bottom wall 10 and the rails 21.

Provided in the vicinity of the edge at which the bottom wall 10 and rear wall 13 butt together is a transverse swivel spindle 44 and the drawing shows the fixed body 7 (without bottom wall 10, that is to say only comprising rear wall 13, top wall 12 and side walls 11 and 11') swivelled backward. A swivel angle α of about 90° is possible, therefore swivelling together with the mobile part 8 placed on behind, as shown in FIG. 3, would also be feasible. Swivelling is beneficial in this described version, for example for cleaning purposes.

It would, of course, also be conceivable to use such a fixed body version without a rigid mobile body 8, in that case with approximately a cuboidal form, in which a flexible protective covering, for example designed as a sheet, is used for example at the upper edge of the fixed body 7. In this configuration, the swivelling serves primarily for making the wound rolls 3 and 4 of the spindles 33 and 34 accessible during unloading and loading.

Special features in FIG. 4 are also the catching means 45, which interact, in a normal position (transporting state), with hooks or eyes (not shown) on the inner side of the side walls 11 and 11' of the fixed body 7. Other clamping closures 46 and 46 are also provided, by means of which the wound rolls 3, 4 are axially clamped and held on the spindles 33 and 34.

FIG. 5 shows the basic frame 50 of the fixed body 7, comprising a bottom frame 55 formed by the hollow-cuboid rails 21 with cutouts 41, connected by two short crossmembers 51A and 51B, a T-shape member 52 being flange-mounted on the rear crossmember 51B, the upper crossmember 53 reaching over the entire width of the basic frame 50. The ends of the crossmember 53 form the fastening points for oblique, approximately diagonally arranged, side members 54A and 54B, which are fastened on the other hand on the hollow-cuboid rails 21 and are designed as sectional sheet-metal rails. Suitably fastened on the central part of the T-shape member 52 are the receiving spindles 33 and 34 with the engaging groove 36 and the clamping closure 35, in order that, with a spindle length of 60 cm, they are able to receive and support a wound roll weight of 80 kg each per spindle 33 or 34 (in the case of 40 wound rolls of video tape). The frame parts favorably consist of aluminum or aluminum alloys, to keep the transporting weight low. The fasting points are produced, for example, by means of spot welding.

Indicated by dashed lines are the container walls to be suitably fastened on the basic frame: top wall 12, rear wall 13, side walls 11 and 11' and also bottom wall 10, which either consist of aluminum, an aluminum alloy and/or suitable plastic.

Thus, simple parts can be used to provide a stable, lightweight end expedient fixed body for a receiving and transporting device.

The mobile body does not require a frame if it is made in a dimensionally stable form from bent and interwelded sheet-metal and/or plastic parts.

It is also possible to use the frame 43 indicated in FIG. 4 instead of the T-shape member 52 in the basic frame 50.

A receiving and transporting device for articles with a through-opening comprises a basic frame and two connectable container bodies, one of the end-face openings fitting over one of the body rear parts, for volume reduction and storing purposes. A special transport pallet is designed for receiving four devices with or without content.

We claim:

1. In a receiving device for articles with a through-opening, the receiving device having an L-shape basic frame and, fastened thereon, at least one horizontal receiving spindle and a container body for complete enclosure of the articles, the container body comprising two shell bodies, namely, a fixed shell body, fastenable on the basic frame, and a mobile shell body, both shell bodies together forming bottom, top, and rear side walls having outer contours, each shell body having a front opening and a means for locking together with the other shell body with the front openings facing each other, thereby forming a receiving container which is closed on all sides, the improvement comprising the front opening of the mobile shell body having a contour which is larger than the outer contour of the rear wall of the fixed body so that the mobile shell body can be slipped with its front opening over the rear wall, parts of the top wall and side walls of the fixed shell body in a pickaback configuration, for the purpose of reducing overall volume of the receiving device and of removing the articles therefrom.

2. A device as claimed in claim 1, wherein fixed and mobile shell bodies have fixing means fitting into one another.

3. A device as claimed in claim 1, wherein at least the mobile shell body is provided with grip hollows.

4. A device as claimed in claim 1, wherein the fixed and mobile shell bodies are provided in the vicinity of the bottom wall and top wall with fixing means.

5. A device as claimed in claim 1, wherein a parting plane having parting joints runs substantially diagonally through the container body.

6. A device as claimed in claim 5, wherein the parting joints of the fixed and mobile shell bodies are provided with sealing elements, which are arranged substantially in the parting plane.

7. A device as claimed in claim 1, wherein at least one transparent window part is provided in at least one wall of either the fixed or mobile shell body.

8. A device as claimed in claim 1, wherein protective strips are provided on the fixed and mobile shell bodies.

9. A device as claimed in claim 1, which comprises a swivel mounting of the fixed shell body in the vicinity of the edge formed by the bottom wall and rear wall and catching means for the fixed shell body in its non-swivelled position.

10. A device as claimed in claim 1, which comprises a mobile shell body, a basic frame, which comprises a bottom frame and, fastened thereupon, a T-shape member for holding the receiving spindles and substantially diagonally arranged side members, which connect the crossmember of the T-shape member to the bottom frame.

11. A device as claimed in claim 10, wherein the basic frame is substantially part of the fixed shell body.

12. A device as claimed in claim 10, wherein the mobile shell body is formed without frame.

13. A transport pallet for a plurality of receiving devices as claimed in claim 1, the fixed and mobile shell bodies being provided in the vicinity of the bottom wall and top wall with fixing means, and fixing devices matching the fixing means of the fixed and mobile shell bodies being provided on the transport pallet.

14. A transport pallet as claimed in claim 13, wherein a plurality of groups of fixing devices are provided.

* * * * *